United States Patent [19]

Lee

[11] Patent Number: 5,863,276
[45] Date of Patent: Jan. 26, 1999

[54] CONTROL SYSTEM HAVING AN IMPROVED RESPONSIVENESS TO A THIRD-TO-FIRST SPEED SKIP SHIFT

[75] Inventor: Hee-Yong Lee, Seoul, Rep. of Korea

[73] Assignee: Hyundai Motor Company, Seoul, Rep. of Korea

[21] Appl. No.: 768,270

[22] Filed: Dec. 17, 1996

[30] Foreign Application Priority Data

Dec. 21, 1995 [KR] Rep. of Korea .................. 95 53496

[51] Int. Cl.⁶ .................................................. F16H 61/02
[52] U.S. Cl. .......................................... 477/144; 477/136
[58] Field of Search .................................... 477/136, 141, 477/144, 154, 155, 132, 133, 135, 139, 140

[56] References Cited

U.S. PATENT DOCUMENTS

| | | | |
|---|---|---|---|
| 3,653,281 | 4/1972 | Shirai et al. | 477/139 X |
| 4,833,947 | 5/1989 | Izumi et al. | 477/139 |
| 4,905,545 | 3/1990 | Leising et al. | 477/133 |
| 5,168,777 | 12/1992 | Isono et al. | 477/154 X |
| 5,462,500 | 10/1995 | Benford et al. | 477/154 |
| 5,624,351 | 4/1997 | Fujita et al. | 477/148 |

FOREIGN PATENT DOCUMENTS

0529777A1  3/1993  European Pat. Off. .
0678690A1  10/1995  European Pat. Off. .
WO95/00354  1/1995  WIPO .

*Primary Examiner*—Richard M. Lorence
*Assistant Examiner*—Scott Lund
*Attorney, Agent, or Firm*—Christie, Parker & Hale, LLP

[57] ABSTRACT

A control system having an improved responsiveness to a third-to-first speed skip shift by controlling a hydraulic pressure for disengaging a front clutch. The system employs a sensor for sensing the revolution per minute of an engine wherein an electrical signal is variable according to the rotational speed of the engine, a sensor for sensing the revolution per minute of an output shaft wherein an electrical signal is variable according to the rotational speed of the output shaft, and a sensor for sensing the opening of a throttle valve wherein the opening of the throttle valve is variable according to the operation of an accelerator pedal and for outputting a corresponding electrical signal. A transmission control unit determines the state of the automatic transmission by reading the output signals from sensors and setting the duty ratio for controlling the operation of a hydraulic pressure control solenoid valve for controlling an operation of friction members thereby allowing the automatic transmission to be gradually shifted from third-to-second-to-first speed if it determined that the transmission is in a third-to-first speed shift.

7 Claims, 3 Drawing Sheets

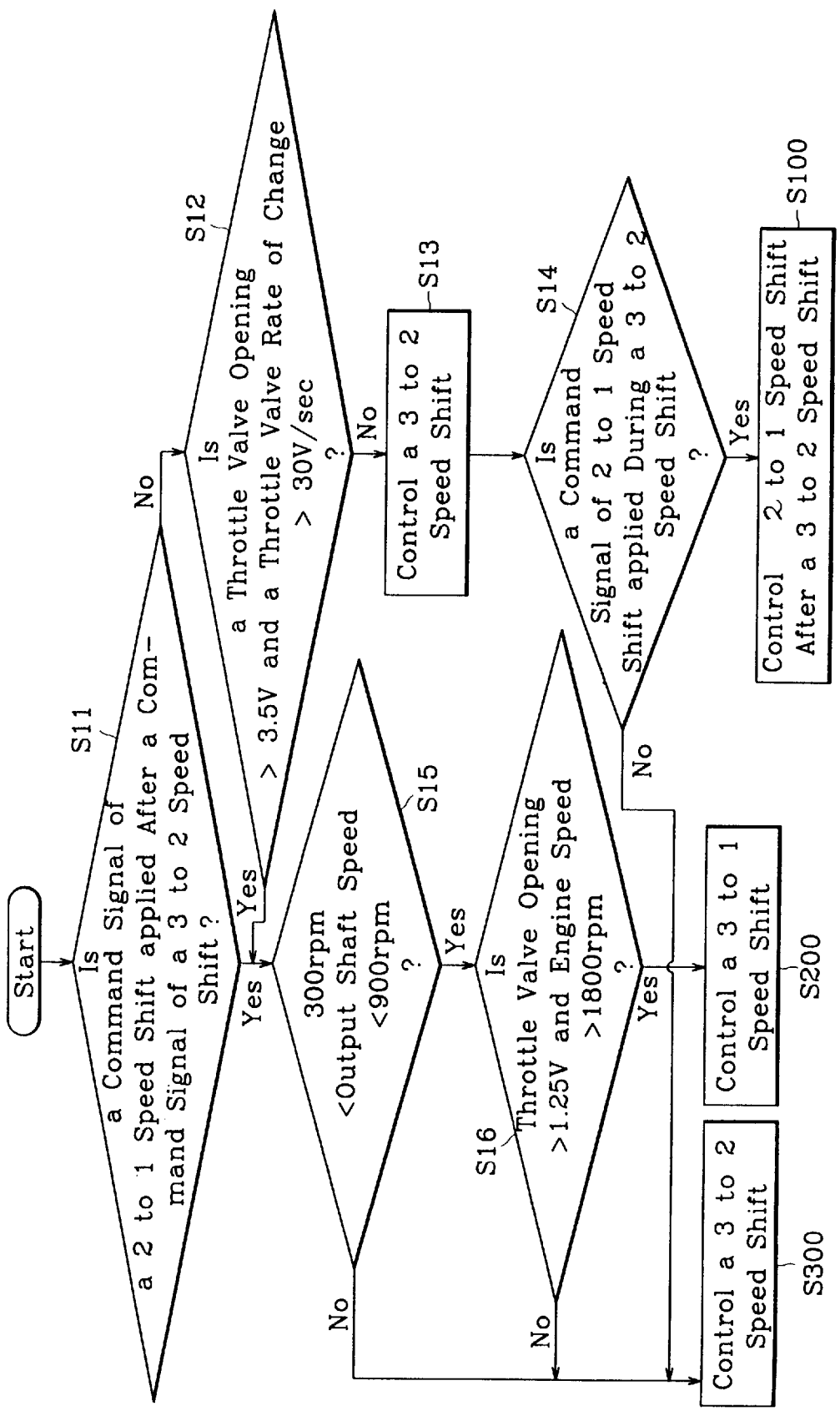

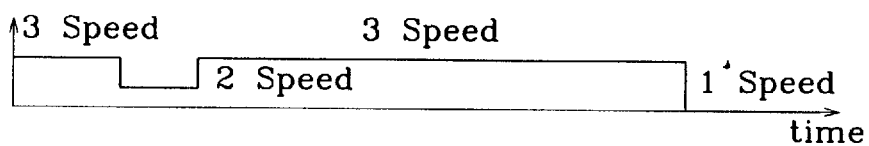
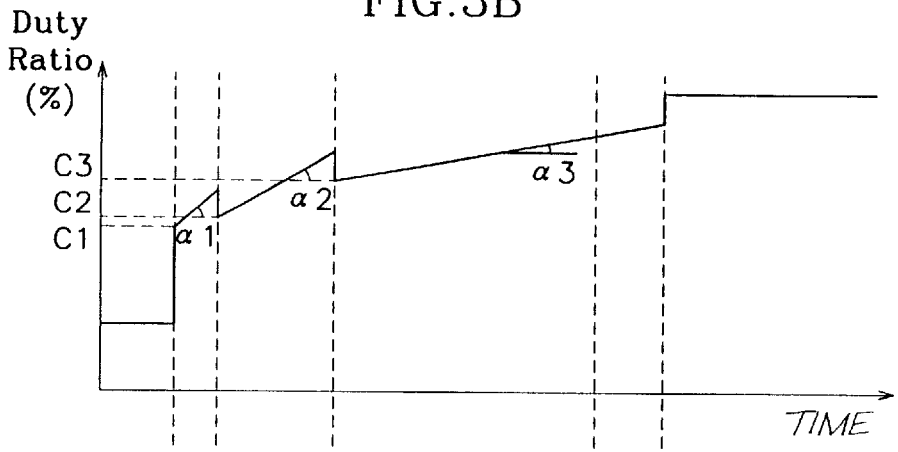
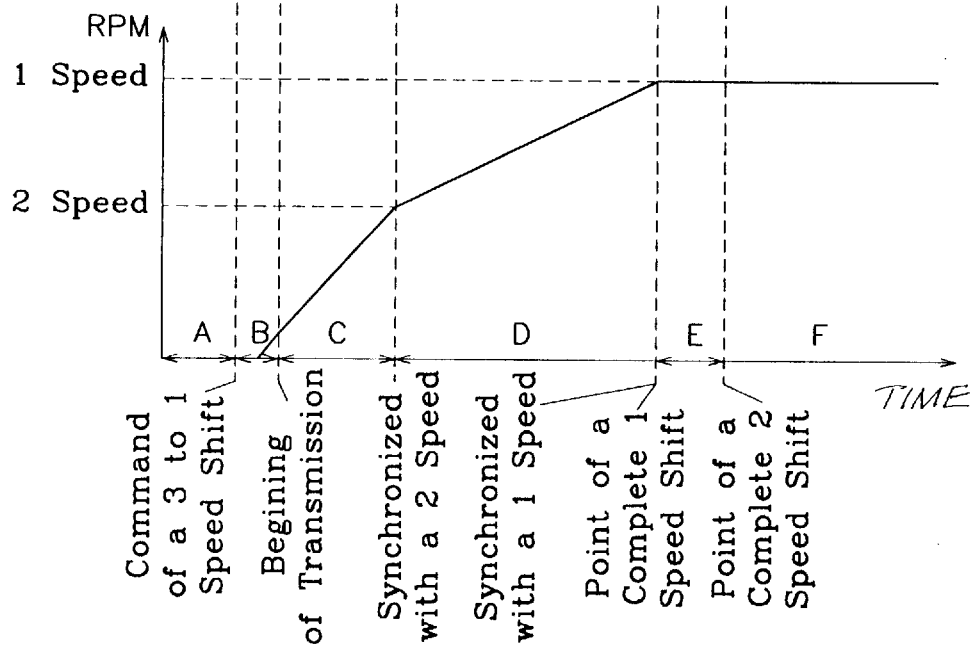

CONTROL SYSTEM HAVING AN IMPROVED RESPONSIVENESS TO A THIRD-TO-FIRST SPEED SKIP SHIFT

FIELD OF THE INVENTION

The present invention relates to a control system for a third-to-first speed skip shift, and more particularly, to a control system having an improved response for a third-to-first speed skip shift by controlling hydraulic pressure which controls the operation of a front clutch on the exhaust side.

BACKGROUND OF THE INVENTION

Generally, using an automatic transmission, the transmission gear is maintained at an optimal position by controlling hydraulic pressure which is set by the speed of the vehicle.

Therefore, the operation of an automatic transmission in a vehicle requires minimum effort on the part of the driver, and removes the necessity for the driver to use a clutch pedal. Also, the automatic transmission makes driving easy since there is little possibility of the engine stalling due to driver error or unskilled operation.

The conventional transmission controls rotary power of the fluid by operating a torque converter in accordance with the output power of an engine, and feeds hydraulic pressure to a corresponding valve according to the control signal applied in a transmission control system.

Hydraulic fluid from an oil pump is pressure regulated by a hydraulic pressure valve and used to control a plurality of parts in accordance with a transmission lever selected by the driver, the speed of the vehicle, and the opening of the throttle. The hydraulic pressure is coupled to friction members through the ports to control the operation of a planetary gear resulting in a drive gear operated at a set transmission ratio. The transmission ratio is fed to a first drive gear which engages a final reduction gear via a second drive gear which, in turn, engages the drive gear.

When the automatic transmission automatically changes speeds, in accordance with the speed of the vehicle, the necessity for reducing the shift shock generated due to the repetitive operation of the friction members occurs. It is possible to minimize the shift shock by controlling the hydraulic pressure for controlling the operation of the front clutch by varying the duty ratio for a hydraulic pressure control solenoid valve according to the respective state of the transmission.

However, the conventional transmission does not control the hydraulic pressure for the purpose of reducing shift shock at the third-to-first speed, skip shift. Therefore, a driver using a conventional transmission in the third-to-first speed skip shift state faces a large shift shock since the operation of the front clutch, which has been operated in third speed is disengaged and thereby the hydraulic pressure, which has been fed to the front clutch, is abruptly exhausted.

SUMMARY OF THE INVENTION

The present invention has been made in an effort to solve the above-mentioned problems. It is an object of the present invention to provide a control system having improved response to a third-to-first speed shift by controlling the hydraulic pressure for controlling the operation of the front clutch.

Additional objectives and advantages of the present invention will be set forth in part in the description which follows, and in part will be clear from the description, or may be learned by practice of the invention. The objectives and advantages of the present invention are particularly pointed out in the appended claims.

To achieve the above objectives in accordance with the purpose of the invention, as embodied and broadly described herein, the present invention comprises:

a sensor for sensing the revolution per minute (RPM) of an engine wherein an output electrical signal is variable according to the rotational speed of the engine;

a sensor for sensing the RPM of an output shaft wherein an output electrical signal is variable according to the rotational speed of the output shaft;

a sensor for sensing the opening of a throttle valve wherein the opening of the throttle valve is variable according to the operation of an accelerator pedal and for outputting the corresponding electrical signal;

a transmission control unit for reading the output signals from the above-mentioned sensors thereby determining the state of the automatic transmission, and changing a duty ratio for controlling an operation of friction members and thereby changing the automatic transmission to be in the state of a gradual third-to-first shift if it is determined that the transmission is operated in a third-to-first speed skip shift.

a pressure control solenoid valve wherein the operation is variable according to the control signal output from the transmission control unit 2.

BRIEF DESCRIPTION OF THE DRAWINGS

The above objective and feature of the present invention will be apparent from the following description of the embodiment with reference to the accompanying drawings.

FIG. 2 is a flow chart illustrating the method for determining whether or not the automatic transmission is in a third-to-first speed skip shift according to the embodiment of the present invention.

FIG. 3A illustrates the state of the transmission position according to the embodiment of the present invention.

FIG. 3B illustrates the pattern of the duty ratio for the hydraulic pressure according to the embodiment of the present invention.

FIG. 3C illustrates the graph showing the variable RPM of an output shaft according to the embodiment of the present invention.

DESCRIPTION OF THE PREFERRED EMBODIMENTS

Figure 1:
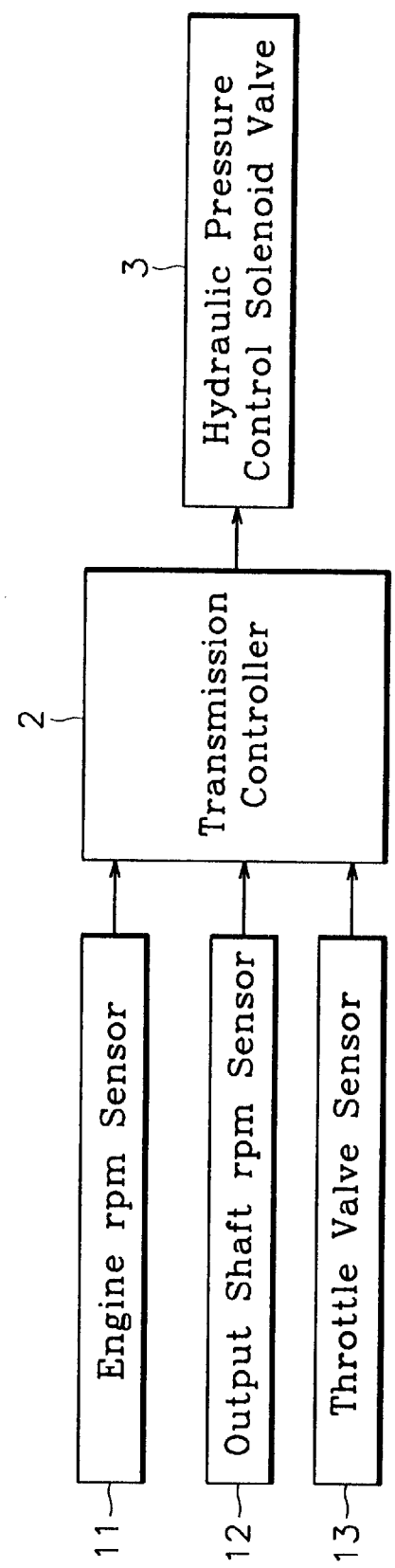
FIG. 1 is a block diagram for a control system having improved response to a third-to-first speed skip shift according to the embodiment of the present invention.

Reference will now be made in detail to present the preferred embodiment of the present invention, an example of which is illustrated in the accompanying drawings.

Referring to FIG. 1, the present invention comprises a sensor 11 for monitoring the RPM of the engine, a sensor 12 for monitoring the RPM of the output shaft of the transmission, a sensor 13 for monitoring the opening of a throttle valve controlled by the operation of an accelerator pedal, and a transmission control unit 2 for determining the state of the automatic transmission as a function of the three input sensors. When the transmission is operated in a third-to-first speed skip shift, the transmission control unit 2 changes the duty ratio applied to a hydraulic pressure control solenoid valve 3 for controlling the front clutch on the exhaust side to allow the automatic transmission to gradually effect a third-to-first shift.

Referring to FIG. 2, the method implemented by the transmission control unit 2 for determining whether or not the automatic transmission is in a third-to-first speed skip shift is illustrated. The transmission control unit 2 initially determines whether a second-to-first speed command is applied after a third-to-second speed shift command S11. If the command for the second-to-first speed shift is not applied, the transmission control unit 2 determines whether the vehicle is accelerating or decelerating. The transmission control unit 2 determines this by reading the output signal from the throttle valve sensor and detecting whether the rate of change of the opening of the throttle valve in time exceeds 30 V/sec and whether the opening of the throttle valve exceeds 3.5 V S12. If these conditions are satisfied, the transmission control unit 2 determines that the vehicle is accelerating after a momentary deceleration. The transmission control unit 2 will then determine whether or not the transmission is in the third-to-first speed shift.

If these conditions are not satisfied, the transmission control unit 2 determines that the vehicle is decelerating, and controls the third-to-second speed shift S13. The transmission control unit 2 then determines whether a command signal for a second-to-first speed shift is applied during the operation of the third-to-second speed shift S14. If the command signal for the second-to-first speed shift is applied, the transmission control unit 2 determines that the transmission is in a third-to-second-to-first speed shift state and controls the third-to-second speed shift and then the second-to-first speed shift S100.

If the command signal for the second-to-first shift is applied after the command signal for the third-to-second shift in step S11 or the rate of change of the opening of the throttle valve and the opening of the throttle valve satisfy the above-mentioned conditions in step S12, the transmission control unit 2 then determines whether the RPM of the output shaft of the transmission is between 300 and 900 RPM S15 by reading the output signal from the output shaft RPM sensor. If the RPMs of the output shaft exceed 900 RPM, the shift shock may not be significant since the vehicle is running at a high speed. Therefore, in this case, the transmission control unit 2 controls the third-to-second speed shift S300.

If the RPMs of the output shaft is between 300 and 900 RPM, the transmission control unit 2 determines whether or not the opening of the throttle valve exceeds 1.25 V by reading the throttle valve sensor, and whether the RPMs of engine exceed 1800 RPM S16 by reading the output signal from the engine RPM sensor. Then, the transmission control unit 2 compares the determined engine RPMs and the opening of the throttle valve with the running conditions necessary for the third-to-first speed skip shift.

If the above-mentioned running condition is met, the transmission control unit 2 determines the current state of the transmission as being in a third-to-first speed skip shift and controls the duty ratio of the hydraulic pressure to disengage the front clutch in order to reduce the shift shock generated due to the skip shift S200.

If the above-mentioned running condition is not met, the transmission control unit 2 controls the third-to-second shift S300.

FIGS. 3A–3C illustrate the state of the transmission during the third-to-first skip shift. When the command signal for the third-to-first speed skip shift is applied in section "A," the transmission control unit 2 disengages the end clutch which is operating in third speed by controlling the transmission in second speed for a predetermined time. The front clutch operating in third speed is still engaged with the friction members due to the mechanical construction of the automatic transmission when the transmission control unit 2 is in second speed. In order to disengage the front clutch, the transmission control unit 2 increases the duty ratio of the control signal for controlling the operation of the hydraulic pressure control solenoid valve 3 to the point C1, and then increases the duty ratio at a gradient $\alpha 1$ to the point at which the transmission begins to shift speeds. At this time, the transmission control unit 2 controls a second-to-third speed shift.

The transmission control unit 2 increases gradually the duty ratio at a gradient $\alpha 2$ after decreasing the duty ratio to a point C2 in section "C." As a result, the hydraulic pressure control solenoid valve 3 is operated to change the automatic transmission from third speed to second speed.

When the automatic transmission gear is synchronized with the second speed via the operation of the hydraulic pressure control, the transmission control unit 2 increases gradually the duty ratio at a gradient $\alpha 3$ after decreasing the duty ratio to a point C3 in section "D" so that the automatic transmission operates in first speed. The RPM of the turbine shaft is increased to that of the first speed.

When the automatic transmission is synchronized with the first speed by controlling the operation of the hydraulic pressure control solenoid valve 3, the transmission control unit 2 continues to increase the duty ratio at the gradient $\alpha 3$ for a predetermined time. As a result, the vehicle remains at the first speed.

Section "E" in which the vehicle is running in the first speed provides the necessary time for changing the operation of the automatic transmission to first speed. When the automatic transmission is completely in first speed, the transmission control unit 2 changes the transmission position to the first speed.

Therefore, the present invention prevents the shift shock during the third-to-first speed skip shift from being generated due to a sudden torque conversion, allowing the automatic transmission to be in a gradual third-to-second speed shift, then a gradual second-to-first speed shift.

What is claimed is:

1. A method for improving the responsiveness of an automatic transmission to a third-to-first speed skip shift, the transmission being connected to an engine having a throttle valve, the method comprising the steps of:

determining whether a command signal for a second-to-first speed shift is applied after a command signal for a third-to-second speed shift;

determining whether an output shaft of the transmission is rotating at a certain speed if said command signal for a second-to-first speed shift is applied after said command signal for a third-to-second speed shift; and determining the opening of the throttle valve and the rotational speed of the engine if it is determined that the output shaft is rotating at said certain speed, and generating a third-to-first speed skip shift if the opening of said throttle valve is at a certain position and the rotational speed of said engine is at a predetermined speed.

2. The method of claim 1 wherein said certain speed of the output shaft is substantially between 300 and 900 rotations per minute.

3. The method of claim 1 wherein said certain position of the throttle valve is converted to an electrical signal which exceeds 1.25 volts.

4. The method of claim 1 wherein said predetermined speed of the engine exceeds 1800 rotations per minute.

5. The method of claim 1 wherein the step of generating a third-to-first speed skip shift comprises the steps of:

controlling a duty ratio of a hydraulic pressure control solenoid valve at a first predetermined state for a predetermined period to release an end clutch of the transmission;

increasing the duty ratio to a second predetermined state and increasing the duty ratio at a first predetermined gradient until the transmission begins shifting to release a front clutch of the transmission after releasing the end clutch;

increasing the duty ratio at a second predetermined gradient after decreasing the duty ratio to a third predetermined state for controlling the hydraulic pressure control solenoid valve for a third-to-second speed shift until the transmission shifts to second speed; and increasing the duty ratio at a third predetermined gradient after decreasing the duty ratio to a fourth predetermined state.

6. The method of claim 5 wherein the step of generating the third-to-first speed skip shift further comprises step of further increasing the duty ratio at the third predetermined gradient for a predetermined time after the transmission shifts to first speed to compensate an operating state of the transmission.

7. A method for improving the responsiveness of an automatic transmission to a third-to-first speed skip shift, the transmission being connected to an engine having a throttle valve, the method comprising the steps of:

determining whether a command signal for a second-to-first speed shift is applied after a command signal for a third-to-second speed shift;

measuring a first opening of the throttle valve and a rate of change of the throttle valve opening if said command signal for a second-to-first speed shift is not applied after said command signal for a third-to-second speed shift;

determining whether an output shaft of the transmission is rotating within a certain speed range if it is determined that the first opening of the throttle valve is greater than a first position and the rate of change of the throttle valve opening exceeds a predetermined value; and measuring a second opening of the throttle valve and the rotational speed of the engine if it is determined that the output shaft is rotating within said certain speed range, and generating a third-to-first speed skip shift if the second opening of said throttle valve is greater than a second position and the rotational speed of said engine is within a predetermined speed range.

* * * * *